Nov. 6, 1928.
G. D. BLY
1,690,470
BOTTLE FILLING DEVICE
Filed Feb. 11, 1927
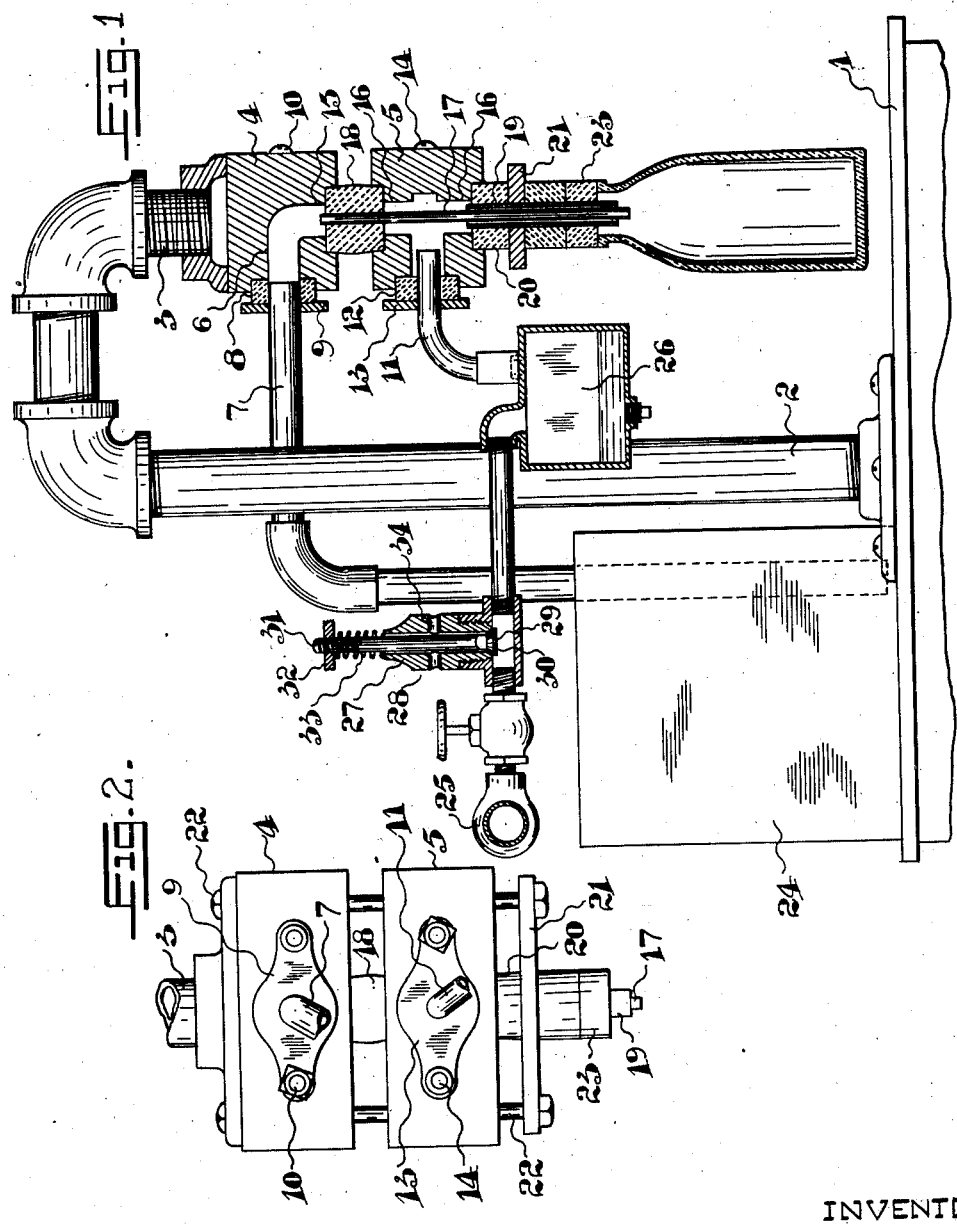
INVENTOR.
G. D. Bly.
BY J. Edward Maybee
ATTY.

Patented Nov. 6, 1928.

1,690,470

UNITED STATES PATENT OFFICE.

GILFORD D. BLY, OF TORONTO, ONTARIO, CANADA.

BOTTLE-FILLING DEVICE.

Application filed February 11, 1927. Serial No. 167,452.

This invention relates to bottle filling devices of the type in which the bottle, through the medium of a filler head, is connected with a vacuum pump and a source of liquid supply so that, as the air is removed from the bottle, liquid flows in to supply its place.

It is important that such heads should be so constructed that they may be easily cleaned and of a material substantially inert in contact with any one of a large range of liquids.

My object therefore is to devise such a head and to arrange the apparatus so that a number of heads may be readily served from one vacuum air line.

I attain my object by forming the heads of wood and the tubing of glass, connections and stuffing boxes being of elastic rubber. In the air line connected to each head is placed a liquid trap and a spring controlled valve adapted to open to limit the vacuum in the line to any desired sub-atmospheric pressure. The whole is constructed in detail substantially as hereinafter described and as illustrated in the accompanying drawings in which Fig. 1 is a side elevation, partly in section of the apparatus; and Fig. 2 a rear elevation of the head.

In the drawings like numerals of reference indicate corresponding parts in the different figures.

1 is a table or bench, to which is secured a standard 2, preferably formed of pipe, to which the filler head is secured. Preferably the standard extends laterally and then downwardly and the head is secured thereto by means of the threaded nipple 3 threaded into a metal plate secured to the upper block 4 of the filler head.

The filler head comprises the upper block 4 and the lower block 5. These blocks are preferably formed of wood, which is inert in contact with any one of a large range of liquids. Each block has a cavity formed therein. The upper block 4 has an opening 6 in one side opening into the interior space. Into this opening extends a pipe 7, preferably of glass. Surrounding this pipe is an annular elastic gasket 8, which is preferably fitted into a recess in the side of the head surrounding the opening 6. A clamp plate 9 engages the gasket, which clamp plate may be set up to compress the gasket by means of the bolts 10 passing through the clamp plate and the block 4, thus forming a fluid tight joint between the gasket, the pipe and the block. A pipe 11 is connected in the same manner to the block 5 in communication with the space therein by means of a similar gasket 12, the clamp plate 13 and bolts 14.

In the underside of the block 4 is formed an opening 15 communicating with the space in the block. In the block 5 are formed the openings 16 in alinement with one another and the opening 15. A glass tube 17 passes through the openings 15 and 16. Surrounding the tube, between the two blocks, is located an elastic gasket 18, preferably having its ends set in recesses surrounding the adjacent openings 15 and 16. It is evident that, when this elastic gasket is compressed, by drawing together the blocks 4 and 5, a fluid tight joint will be formed between the gasket, the tube and the blocks. Surrounding the glass tube 17 is a larger glass tube 19 extending into the lower opening 16 of the block 5. Surrounding this tube and fitted into a recess about the lower opening 16 is an elastic gasket 20. Engaging the gasket is a clamp plate 21, which is adapted to be set up by bolts 22 passing through the clamp plate and through the two blocks 4 and 5. By tightening up these bolts, the gaskets 18 and 20 are compressed to form fluid tight joints between the parts as hereinbefore referred to. The glass tube 17 is used as a liquid tube and extends a short distance below the lower end of the glass tube 19, through which the air from the bottle is withdrawn. Fitted over the part of the tube 19 projecting below the clamp plate 21 is an elastic cushion 23, against which the mouth of the bottle may be compressed to secure a fluid tight joint.

Preferably the various elastic gaskets and the cushion are formed of high grade rubber.

The pipe 7 is the liquid supply pipe and dips into the liquid reservoir 24, which may be located in any convenient position.

The pipe 11 is the air pipe and is connected with the air line 25, which is connected with an air pump, not shown.

In the air pipe is located a trap 26 of ordinary construction adapted to trap any liquid accidently drawn up through the air pipe if a bottle be filled too full. There is also located in the air pipe a relief valve 27 adapted to admit atmospheric air into the air pipe if the vacuum increases above a pre-determined maximum.

While any adjustable relief valve would serve my purpose, I show a valve having a valve bonnet 28 formed with an inwardly facing valve seat 29 at its lower end. With the valve seat co-operates the valve disk 30 formed on the valve stem 31, which extends up through the bonnet and has a nut 32 threaded on its upper end. Between this nut and the upper end of the bonnet is located a coil spring 33. Openings 34 in the side of the bonnet form inlets through which air may pass and thence down around the valve stem and past the valve whenever the vacuum in the pipe 11 is sufficiently high to open the valve against the tension of the spring 33. By adjusting the nut I can ensure that the vacuum at no time becomes sufficiently great to cause foaming of the liquid entering the bottle, hence, though a number of different heads are actuated from the one air line, each may be adjusted to suit its own requirements.

In general the mode of operation is the same as in all vacuum filler heads, the bottle being held in position against the cushion 23 until the air therein has been sucked out and replaced by the liquid flowing through the tube 17.

What I claim is:

1. A filler head for bottle filling apparatus comprising two blocks aligned with one another, each having a space for fluid formed therein, aligned openings communicating with such spaces being formed in two sides of one block and the adjacent side of the other; a pipe for fluid connected with each block and communicating with the space therein; a fluid tube extending through the openings and space of one block and into the interior space of the other through the opening therein; an annular elastic gasket fitted between the blocks and through which the tube passes; means for clamping the blocks to compress the elastic gasket to form a fluid tight joint between the gasket and the tube and the blocks; and a tube connected with the second opening of the first mentioned block surrounding the first mentioned tube, one of the tubes being longer than the other.

2. A filler head for bottle filling apparatus comprising two blocks aligned with one another, each having a space for fluid formed therein, aligned openings communicating with such spaces being formed in two sides of one block and the adjacent side of the other; a pipe for fluid connected with each block and communicating with the space therein; a fluid tube extending through the openings and space of one block into the interior space of the other through the opening therein; an annular elastic gasket fitted between the blocks and through which the tube passes; a tube surrounding the first mentioned tube communicating with the second opening of the first mentioned block, one of the tubes being longer than the other; an annular elastic gasket through which the outer tube passes; and means engaging the last mentioned gasket and the block of the head distant therefrom to compress the elastic gaskets to form fluid tight joints between the gaskets aforesaid and the tubes and blocks.

3. A filler head for bottle filling apparatus comprising two blocks aligned with one another, each having a space for fluid formed therein; aligned openings communicating with such spaces being formed in two sides of one block and the adjacent side of the other; a pipe for fluid connected with each block and communicating with the space therein; a fluid tube extending through the openings and space of one block and connected with the interior space of the other block; means for packing joints where the tube passes through contiguous openings in the blocks; and a tube connected with the second opening of the first mentioned block surrounding the first mentioned tube, one of the tubes being longer than the other.

4. A filler head for bottle filling machines comprising two blocks aligned with one another, each having a space for fluid formed therein, aligned openings communicating with such spaces being formed in two sides of one block and the adjacent side of the other; a pipe for fluid extending through another opening in each block into the space therein; an annular gasket surrounding each pipe and contacting with the adjacent block; means for compressing each block to form a fluid tight joint between the gasket and the pipe and block; a fluid tube extending through the aligned openings and space of one block and into the interior space of the other through the adjacent opening therein; an annular elastic gasket fitted between the blocks and through which the tube passes; a tube surrounding the first mentioned tube communicating with the second opening of the first mentioned block, one of the tubes being longer than the other; an annular elastic gasket through which the outer tube passes; and means engaging the last mentioned gasket and the block of the head distant therefrom to compress the said elastic gasket and the gasket between the blocks to form fluid tight joints between the gaskets and the tubes and blocks.

5. A filler head for bottle filling apparatus comprising two blocks aligned with one another, each having a space for fluid formed therein; aligned openings communicating with such spaces being formed in two sides of one block and the adjacent side of the other; a pipe for fluid connected with each block and communicating with the space therein; a fluid tube extending through the openings and space of one block and connected with the interior space of the other block; means for packing joints where the tube passes through contiguous openings in the blocks; a tube connected with the second opening of the first mentioned block surrounding the first mentioned tube, one of the tubes being longer than the other and an elastic gasket surrounding the last mentioned tube and engaging the block; and means for compressing the gasket to form a fluid tight joint between the gasket, the tube and block.

Signed at Toronto, Canada, this 1st day of February, 1927.

GILFORD D. BLY.